United States Patent
Tatsumi et al.

(10) Patent No.: US 11,773,904 B2
(45) Date of Patent: Oct. 3, 2023

(54) BALL BEARING AND METHOD FOR MANUFACTURING SAME

(71) Applicants: OSAKA FUJI CORPORATION, Amagasaki (JP); ASAHI SEIKO CO., LTD., Sakai (JP); University Public Corporation Osaka, Osaka (JP)

(72) Inventors: Yoshihiro Tatsumi, Amagasaki (JP); Yuki Kitamura, Amagasaki (JP); Keiji Munekane, Sakai (JP); Yasuyuki Kaneno, Sakai (JP); Takayuki Takasugi, Sakai (JP)

(73) Assignees: Osaka Fuji Corporation, Hyogo (JP); Asahi Seiko Co., Ltd., Osaka (JP); University Public Corporation Osaka, Osaka (JP)

( * ) Notice: Subject to any disclaimer, the term of this patent is extended or adjusted under 35 U.S.C. 154(b) by 100 days.

(21) Appl. No.: 17/607,372

(22) PCT Filed: Apr. 10, 2020

(86) PCT No.: PCT/JP2020/016128
§ 371 (c)(1),
(2) Date: Oct. 28, 2021

(87) PCT Pub. No.: WO2020/235248
PCT Pub. Date: Nov. 26, 2020

(65) Prior Publication Data
US 2022/0213929 A1 Jul. 7, 2022

(30) Foreign Application Priority Data
May 21, 2019 (JP) .................................. 2019-095313

(51) Int. Cl.
*F16C 19/06* (2006.01)
*F16C 33/58* (2006.01)
(Continued)

(52) U.S. Cl.
CPC .......... *F16C 33/64* (2013.01); *C22C 32/0047* (2013.01); *F16C 19/06* (2013.01);
(Continued)

(58) Field of Classification Search
CPC ........ F16C 19/06; F16C 19/16; F16C 19/163; F16C 33/583; F16C 33/585; F16C 33/586;
(Continued)

(56) References Cited

U.S. PATENT DOCUMENTS 1,356,444 A * 10/1920 Golden ............... F16C 33/6651
384/462
3,797,901 A * 3/1974 Smith ................... F16C 35/063
384/541
(Continued)

FOREIGN PATENT DOCUMENTS

JP H9 280256 A 10/1997
JP 2002-514719 A 5/2002
(Continued)

OTHER PUBLICATIONS

PCT/2020/016128, International Search Report and Written Opinion dated Jun. 23, 2020, 8 pages—Japanese, 9 pages—English.

*Primary Examiner* — Phillip A Johnson
(74) *Attorney, Agent, or Firm* — Andrew F. Young; NOLTE LACKENBACH SIEGEL

(57) ABSTRACT

A ball bearing has an outer circumferential surface of an inner ring subjected to a surface treatment by laser cladding in a circumferential direction, forming an annular first build-up layer with which a plurality of balls 4 is brought into contact so that the balls are rolled in the circumferential direction (first build-up layer formation step). An inner circumferential surface of an outer ring is subjected to a surface treatment by laser cladding in a circumferential
(Continued)

direction, thereby forming an annular second build-up layer with which the plurality of balls contacts so that the balls can be rolled in the circumferential direction (second build-up layer formation step).

16 Claims, 4 Drawing Sheets

(51) Int. Cl.
  *F16C 33/62* (2006.01)
  *F16C 33/64* (2006.01)
  *C22C 32/00* (2006.01)
  *F16C 35/063* (2006.01)
  *B23K 26/342* (2014.01)

(52) U.S. Cl.
  CPC ............ *F16C 33/62* (2013.01); *F16C 35/063* (2013.01); *B23K 26/342* (2015.10); *F16C 33/585* (2013.01); *F16C 2204/52* (2013.01)

(58) Field of Classification Search
  CPC ........ F16C 33/62; F16C 33/64; F16C 35/063; F16C 2204/52; F16C 2220/24; F16C 2223/46; B23K 26/342; C22C 32/0047; C22C 32/0068; C22C 32/0073; C22C 32/0084
  See application file for complete search history.

(56) References Cited

U.S. PATENT DOCUMENTS

| | | | | |
|---|---|---|---|---|
| 5,004,581 A | * | 4/1991 | Takagi | .................. F16C 33/124 |
| | | | | 148/414 |
| 5,132,083 A | * | 7/1992 | Takeda | ...................... C22C 9/06 |
| | | | | 420/490 |
| 5,879,480 A | | 3/1999 | Hetzner | |
| 6,471,410 B1 | | 10/2002 | Jacobson et al. | |
| 2012/0134615 A1 | | 5/2012 | Takasugi et al. | |
| 2013/0308884 A1 | | 11/2013 | Takasugi et al. | |

FOREIGN PATENT DOCUMENTS

| | | | | | |
|---|---|---|---|---|---|
| JP | 2003049848 A | * | 2/2003 | ............ | F16C 33/585 |
| JP | 2003-105511 A | | 4/2003 | | |
| JP | 2006-44375 A | | 1/2006 | | |
| JP | 2006-320907 A | | 11/2006 | | |
| JP | 2009-275792 A | | 11/2009 | | |
| JP | 2012-153955 A | | 8/2012 | | |
| JP | 5424315 B2 | | 12/2013 | | |
| JP | 5445750 B2 | | 1/2014 | | |
| JP | 2014-105379 A | | 6/2014 | | |
| JP | 5737498 B2 | | 5/2015 | | |
| JP | 6128671 B1 | | 4/2017 | | |
| JP | 2018-135585 A | | 8/2018 | | |
| JP | 2017-154159 A | | 9/2019 | | |

\* cited by examiner

BALL BEARING AND METHOD FOR MANUFACTURING SAME

CROSS REFERENCE TO RELATED APPLICATIONS

This application relates to and claims priority as a § 371 national phase, from PCT/JP2020/016128 filed Apr. 10, 2020 (WO 2020/235248), the entire contents of which are incorporated herein by reference, which in turn claims priority to JP Ser. No.: 2019-095313 filed on May 21, 2019

FIGURE SELECTED FOR PUBLICATION

FIG. 2.

TECHNICAL FIELD

The present invention relates to a ball bearing in which a plurality of balls is rollably provided between an inner ring and an outer ring, and a method for manufacturing the ball bearing.

BACKGROUND ART

A ball bearing is configured by providing a plurality of balls between an inner ring and an outer ring. An annular first raceway surface in contact with the plurality of balls are formed on an outer circumferential surface of the inner ring. On the other hand, an annular second raceway surface in contact with the plurality of balls is formed on an inner circumferential surface of the outer ring. That is, the plurality of balls are provided rollably with respect to the first raceway surface and the second raceway surface in a state of being sandwiched between the first raceway surface and the second raceway surface. As a result, when either one of the inner ring and the outer ring is fixed and the other is rotated, the plurality of balls are rolled along the first raceway surface and the second raceway surface, and relative rotation of the inner ring and the outer ring is achieved.

The inner ring and the outer ring are formed of, for example, stainless steel. In this case, the first raceway surface and the second raceway surface are also formed of stainless steel. However, it cannot be said that the ball bearing having such a configuration has high wear resistance at a high temperature, and the ball bearing cannot be used for a longtime in a high-temperature environment of 400° C. or higher. Thus, a service life limit temperature of this type of ball bearing is generally only 400° C.

In a bearing such as a ball bearing, a ceramic material having excellent wear resistance and corrosion resistance/oxidation resistance even at a high temperature may be used in order to improve heat resistance. However, the ceramic material has problems of weak thermal shock resistance and high cost (see, for example, Patent Document 1 below). For this reason, in a case of a bearing using a ceramic material for the inner and outer rings, the life is rather shortened, or the load restriction in use is significantly narrowed. In addition, the manufacturing range is limited, and the size restriction is significant.

PRIOR ART DOCUMENT

Patent Document

Patent Document 1: JP 2003-105511 A

SUMMARY OF THE INVENTION

Problems to be Solved by the Invention

Depending on the environment in which the ball bearing is used, heat resistance may be required so that the ball bearing can be used at a high temperature of 400° C. or higher (for example, 600° C.) for a long time of 2000 hours or longer. In such a high-temperature environment, a ball bearing that is excellent in heat resistance and can be manufactured at low cost has been desired.

The present invention has been made in view of the above circumstances, and an object thereof is to provide a ball bearing which is excellent in heat resistance and can be manufactured at low cost, and a method for manufacturing the ball bearing.

Means for Solving the Problems (1) A ball bearing according to the present invention includes a plurality of balls, an inner ring, and an outer ring. In the inner ring, an annular first raceway surface extending in a circumferential direction is formed on an outer circumferential surface, and the plurality of balls is brought into contact with the first raceway surface and can be rolled in the circumferential direction. In the outer ring, an annular second raceway surface extending in a circumferential direction is formed on an inner circumferential surface, and the plurality of balls is brought into contact with the second raceway surface and can be rolled in the circumferential direction. The first raceway surface and the second raceway surface are formed of a material containing a Ni-based intermetallic compound alloy.

According to such a configuration, both the first raceway surface and the second raceway surface each in contact with the plurality of balls are formed of the material containing the Ni-based intermetallic compound alloy. As a result, it is possible to form the first raceway surface and the second raceway surface which are further improved in wear resistance at a high temperature against contact with the plurality of balls. In addition, the first raceway surface and the second raceway surface are formed of the material containing the Ni-based intermetallic compound alloy, so that hardness is effectively improved by work hardening associated with use.

(2) A ball bearing according to another aspect of the present invention includes a plurality of balls, an inner ring, and an outer ring. In the inner ring, an annular first raceway surface extending in a circumferential direction is formed on an outer circumferential surface, and the plurality of balls are brought into contact with the first raceway surface and can be rolled in the circumferential direction. In the outer ring, an annular second raceway surface extending in a circumferential direction is formed on an inner circumferential surface, and the plurality of balls are brought into contact with the second raceway surface and can be rolled in the circumferential direction. In at least one of the first raceway surface and the second raceway surface, a groove having a width smaller than a diameter of the balls is annularly formed along the circumferential direction.

According to such a configuration, wear debris generated by rolling of the plurality of balls in contact with the first raceway surface and the second raceway surface are discharged from the contact surface (raceway surface) into the groove. As a result, wear of the contact surface caused by the wear debris can be prevented, so that durability can be further improved. In addition, since places where the plurality of balls are brought into contact with the first raceway surface and the second raceway surface can be divided to increase the number of contact points, load can be dispersed, so that a loading capability of the ball bearing can be improved.

(3) A method for manufacturing a ball bearing according to the present invention is a method for manufacturing a ball bearing in which a plurality of balls is rollably provided between an inner ring and an outer ring, the method including a first build-up layer formation step and a second build-up layer formation step. In the first build-up layer formation step, an outer circumferential surface of the inner ring is subjected to a surface treatment by laser cladding in a circumferential direction, thereby forming an annular first build-up layer with which the plurality of balls is brought into contact so that the balls can be rolled in the circumferential direction. In the second build-up layer formation step, an inner circumferential surface of the outer ring is subjected to a surface treatment by laser cladding in a circumferential direction, thereby forming an annular second build-up layer with which the plurality of balls are brought into contact so that the balls can be rolled in the circumferential direction.

According to such a configuration, both the first build-up layer and the second build-up layer each in contact with the plurality of balls are formed by laser cladding. By using laser cladding, it is possible to form the first build-up layer and the second build-up layer having high wear resistance at a high temperature against contact with the plurality of balls while minimizing thermal influence on each of base materials of the inner ring and the outer ring. This makes it possible to manufacture a ball bearing excellent in heat resistance.

(4) In the first build-up layer formation step, a first weld material containing a Ni-based intermetallic compound alloy may be melted to form the first build-up layer on the outer circumferential surface of the inner ring with the first weld material. In the second build-up layer formation step, a second weld material containing a Ni-based intermetallic compound alloy may be melted to form the second build-up layer on the inner circumferential surface of the outer ring with the second weld material.

According to such a configuration, the first build-up layer and the second build-up layer are formed using the weld material containing the Ni-based intermetallic compound alloy. As a result, as compared with a case where the entire inner ring and the entire outer ring are formed of the Ni-based intermetallic compound alloy, it is possible to manufacture a ball bearing having higher wear resistance at a high temperature at low cost by using the Ni-based intermetallic compound alloy only for the raceway surfaces.

(5) In the first build-up layer formation step, first hard particles may be dispersed in the first weld material that has been melted. In the second build-up layer formation step, second hard particles may be dispersed in the second weld material that has been melted.

According to such a configuration, the first build-up layer and the second build-up layer are formed using the weld material in which hard particles are dispersed. Accordingly, the wear resistance of the ball bearing at a high temperature can be further improved.

(6) A groove having a width smaller than a diameter of the balls may be annularly formed along the circumferential direction in at least one of the first build-up layer and the second build-up layer.

According to such a configuration, wear debris generated by rolling of the plurality of balls in contact with the first build-up layer and the second build-up layer is discharged from the contact surface (raceway surface) into the groove.

As a result, wear of the contact surface caused by the wear debris can be prevented, so that durability of the ball bearing can be further improved. In addition, since places where the plurality of balls are brought into contact with the first build-up layer and the second build-up layer can be divided to increase the number of contact points, the load can be dispersed, so that the loading capability of the ball bearing can be improved.

Effects of the Invention

According to the ball bearing of the present invention, the first raceway surface and the second raceway surface are formed using the material containing the Ni-based intermetallic compound alloy, thereby making it possible to form the first raceway surface and the second raceway surface which are further improved in wear resistance at a high temperature against contact with the plurality of balls.

According to another ball bearing of the present invention, wear debris can be discharged from the contact surface (raceway surface) to the groove, and wear of the contact surface caused by the wear debris can be prevented, so that durability can be further improved.

According to the method for manufacturing a ball bearing according to the present invention, laser cladding is used, thereby making it possible to form the first build-up layer and the second build-up layer having high wear resistance at a high temperature against contact with the plurality of balls while minimizing thermal influence on each of base materials of the inner ring and the outer ring, so that a ball bearing having excellent heat resistance can be manufactured at low cost.

MODE FOR CARRYING OUT THE INVENTION

1. Configuration Example of Ball Bearing

Figure 1:
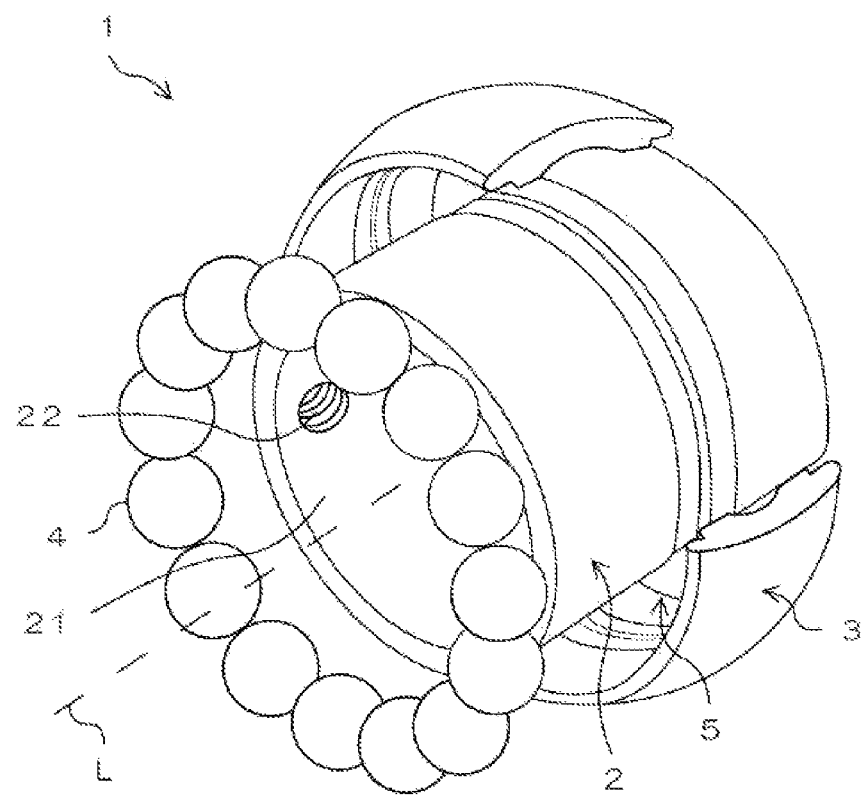
FIG. 1 is an exploded perspective view illustrating a configuration example of a ball bearing according to an embodiment of the present invention.
Figure 2:
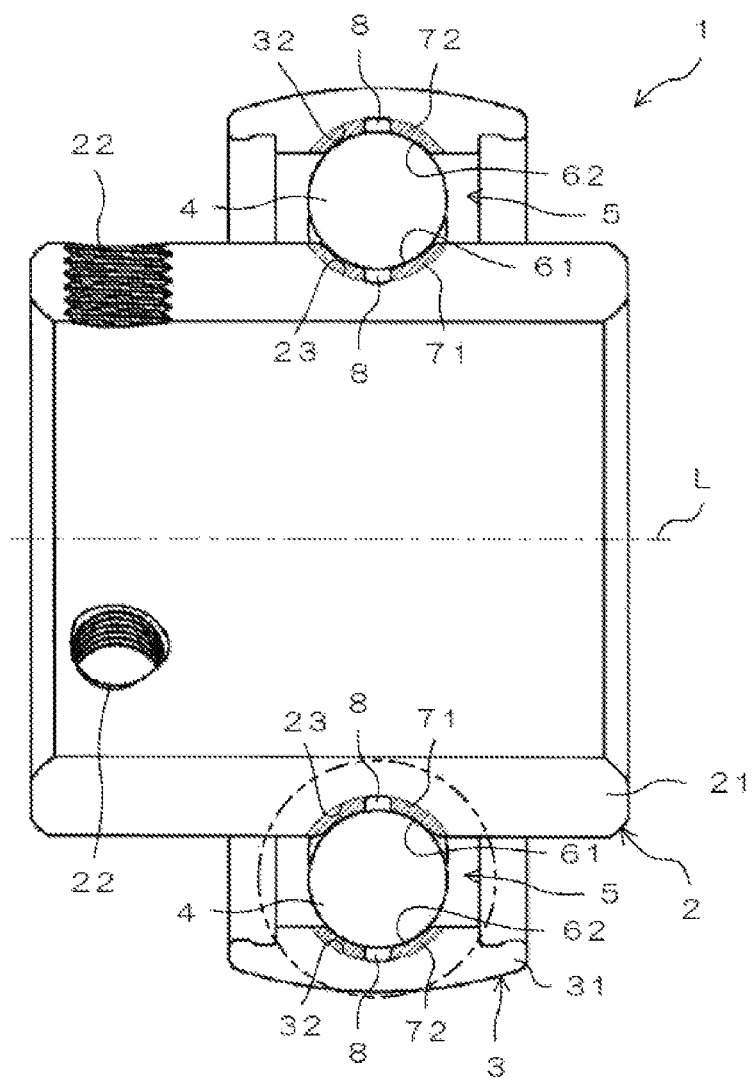
FIG. 2 is a cross-sectional view of the ball bearing in an assembled state.

FIG. 1 is an exploded perspective view illustrating a configuration example of a ball bearing 1 according to an embodiment of the present invention. FIG. 2 is a cross-sectional view of the ball bearing 1 in an assembled state. The present invention is applicable to various ball bearings such as a deep groove ball bearing, an angular ball bearing, a self-aligning ball bearing, or a thrust ball bearing. The ball bearing 1 in the present embodiment includes an inner ring 2, an outer ring 3, and a plurality of balls 4. The inner ring 2 and the outer ring 3 are arranged on a same axis L, and the plurality of balls 4 are arranged side by side in a circumferential direction between the inner ring 2 and the outer ring 3.

The inner ring 2 is an annular member formed of a base material 21 made of a metal such as stainless steel. As the stainless steel, austenitic stainless steel, ferritic stainless steel, martensitic stainless steel, or the like can be used. A shaft member (not illustrated) is inserted into and fixed to the inner ring 2. One or more screw holes 22 are formed in the inner ring 2, and the shaft member is fixed within the inner ring 2 by a screw (not illustrated) as a fixing tool screwed into the screw hole 22. However, the screw hole 22 may be omitted.

The outer ring 3 is an annular member formed of a base material 31 made of a metal such as stainless steel. As the stainless steel, austenitic stainless steel, ferritic stainless steel, martensitic stainless steel, or the like can be used. An inner diameter of the outer ring 3 is larger than an outer diameter of the inner ring 2. Therefore, by arranging the outer ring 3 on the same axis L with respect to the inner ring 2, an outer side of the inner ring 2 is covered with the outer ring 3, and a space 5 is formed between the outer circumferential surface of the inner ring 2 and the inner circumferential surface of the outer ring 3. The plurality of balls 4 are arranged side by side in the circumferential direction within the space 5.

Each of the balls 4 has the same shape, and, for example, at least a surface thereof is formed of ceramics. A diameter of the ball 4 is determined according to a size of the ball bearing 1 in a range of 0.8 to 47.6 mm, for example. When an inner diameter of the inner ring 2 of the ball bearing 1 is 8 to 140 mm, the diameter of the ball 4 is, for example, 3.98 to 47.6 mm. When the inner diameter of the inner ring 2 of the ball bearing 1 is 12 to 140 mm, the diameter of the ball 4 is, for example, 7.98 to 47.6 mm. However, the plurality of balls 4 are not limited to the material configuration in which the surfaces of the balls 4 are formed of ceramics, and the balls 4 may be formed of a metal such as stainless steel, similarly to the base material 21 of the inner ring 2 and the base material 31 of the outer ring 3, or may be formed of a material other than metal. Materials for the base material 21 of the inner ring 2 and the base material 31 of the outer ring 3 are respectively not limited to stainless steel, and may be another metal or a material other than metal.

Figure 3:
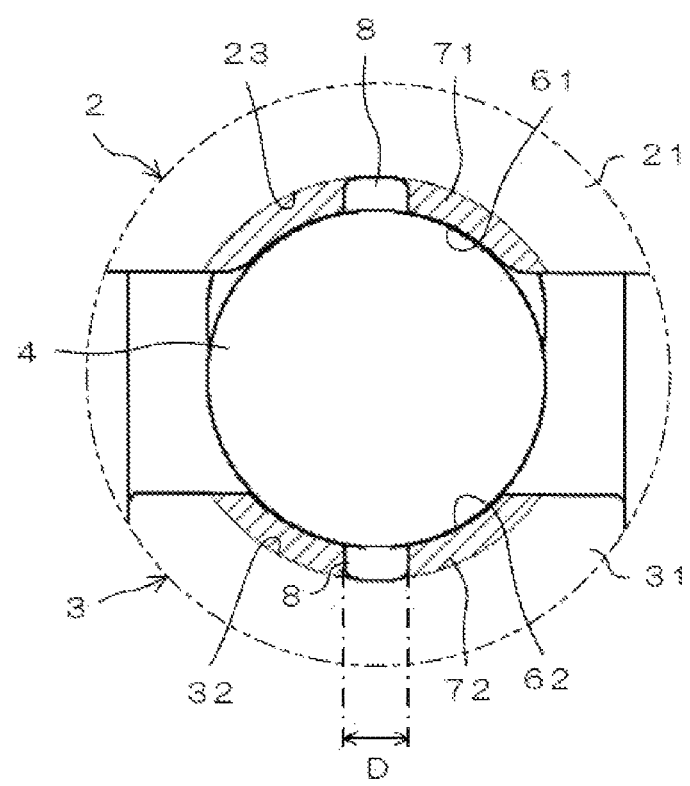
FIG. 3 is an enlarged cross-sectional view illustrating a structure around a ball in an enlarged manner.

FIG. 3 is an enlarged cross-sectional view illustrating a structure around the ball 4 in an enlarged manner, and illustrates a portion indicated by a two-dot chain line in FIG. 2 in an enlarged manner. The plurality of balls 4 arranged side by side in the space 5 between the inner ring 2 and the outer ring 3 are respectively brought into contact with the outer circumferential surface of the inner ring 2 and the inner circumferential surface of the outer ring 3, and retained in a rollable state. A portion of the outer circumferential surface of the inner ring 2 in contact with the ball 4 constitutes a first raceway surface 61 that defines a raceway on which the ball 4 is rolled. A portion of the inner circumferential surface of the outer ring 3 in contact with the ball 4 constitutes a second raceway surface 62 that defines a raceway on which the ball 4 is rolled.

The first raceway surface 61 is constituted by a surface of a first build-up layer 71 formed on an outer circumferential surface of the base material 21 of the inner ring 2. In the outer circumferential surface of the base material 21 of the inner ring 2, a recess 23 is formed in a portion facing the ball 4. The recess 23 is formed by a concavely curved surface having an arc-shaped cross section with a radius of curvature larger than that of the ball 4, and is formed annularly along the circumferential direction in the outer circumferential surface of the base material 21. The first build-up layer 71 is formed annularly by being formed on a surface of the recess 23, and the first raceway surface 61 formed on the surface forms a concavely curved surface having substantially the same radius of curvature as that of the ball 4. However, the first raceway surface 61 is not limited to one constituted by the surface of the first build-up layer 71, and the first raceway surface 61 may be formed by applying, for example, thermal spraying, plating, shrink fitting, or the like to the outer circumferential surface of the base material 21 of the inner ring 2.

The second raceway surface 62 is constituted by a surface of the second build-up layer 72 formed on an inner circumferential surface of the base material 31 of the outer ring 3. In the inner circumferential surface of the base material 31 of the outer ring 3, a recess 32 is formed in a portion facing the ball 4. The recess 32 is formed by a concavely curved surface having an arc-shaped cross section with a radius of curvature larger than that of the ball 4, and is formed annularly along the circumferential direction in the inner circumferential surface of the base material 31. The second build-up layer 72 is formed annularly by being formed on a surface of the recess 32, and the second raceway surface 62 formed on the surface forms a concavely curved surface having substantially the same radius of curvature as that of the ball 4. However, the second raceway surface 62 is not limited to one constituted by the surface of the second build-up layer 72, and the second raceway surface 62 may be formed by applying, for example, thermal spraying, plating, shrink fitting, or the like to the inner circumferential surface of the base material 31 of the outer ring 3.

The plurality of balls 4 are rollably retained in the circumferential direction in a state where the balls 4 are each in contact with the first raceway surface 61 and the second raceway surface 62. When the outer ring 3 is relatively rotated with respect to the inner ring 2 or the inner ring 2 is relatively rotated with respect to the outer ring 3 about the axis L, the plurality of balls 4 are rolled between the first raceway surface 61 and the second raceway surface 62, so that smooth rotation can be realized.

In the present embodiment, as illustrated in FIG. 1, the plurality of balls 4 are arranged adjacent to each other in the circumferential direction. That is, the plurality of balls 4 are not intermittently provided along the circumferential direction, but the plurality of balls 4 are continuously arranged side by side along the circumferential direction. According to such a configuration, it is not necessary to provide a member (retainer) for restricting the plurality of balls 4 from moving in the circumferential direction.

The first build-up layer 71 is formed by subjecting the outer circumferential surface of the base material 21 of the inner ring 2 (the outer circumferential surface of the recess 23) to a surface treatment by laser cladding in the circumferential direction. On the other hand, the second build-up layer 72 is formed by subjecting the inner circumferential surface of the base material 31 of the outer ring 3 (the inner circumferential surface of the recess 32) to a surface treatment by laser cladding in the circumferential direction.

Thicknesses of the first build-up layer 71 and the second build-up layer 72 are preferably 0.1 to 3 mm, and more preferably 0.5 to 1 mm. The first build-up layer 71 and the second build-up layer 72 are each formed with a uniform thickness along the circumferential direction, so that the first raceway surface 61 and the second raceway surface 62 on which the plurality of balls 4 can be smoothly rolled along the circumferential direction are formed.

The first build-up layer 71 and the second build-up layer 72 are each formed with a groove 8 extending annularly along the circumferential direction. The term "annular" includes not only a configuration in which the groove 8 is continuously formed in an endless shape, but also a configuration in which the groove 8 is intermittently formed in the circumferential direction. The groove 8 is formed at a center in a width direction (direction parallel to the axis L) of each of the first build-up layer 71 and the second build-up layer 72. That is, the groove 8 is formed at a bottom of the concavely curved surface constituting the first raceway surface 61 of the first build-up layer 71, and the groove 8 is formed at a bottom of the concavely curved surface constituting the second raceway surface 62 of the second build-up layer 72.

A width D of the groove 8 is smaller than the diameter of the ball 4. More specifically, the width D of the groove 8 is preferably 70 to 90%, and more preferably 75 to 80%, of the diameter of the ball 4. The groove 8 may be configured by forming recesses on the first raceway surface 61 and the second raceway surface 62 after forming the first build-up layer 71 and the second build-up layer 72. Or, when the first build-up layer 71 and the second build-up layer 72 are formed, a plurality of rows thereof is formed at intervals in the width direction, so that the grooves 8 may be constituted by spaces between the rows.

In this example, the grooves 8 are formed in both the first build-up layer 71 and the second build-up layer 72, but the present invention is not limited thereto. The groove 8 may be formed only in either one of the first build-up layer 71 or the second build-up layer 72, or the grooves 8 may be omitted. The groove 8 is not limited to the configuration in which only one row of the groove 8 is formed, and two or more rows of the grooves 8 may be formed side by side in the width direction. A cross-sectional shape of the groove 8 is arbitrary, and is not limited to a U-shape, and may be another shape such as a V-shape.

2. Specific Example of Laser Cladding

Figure 4:
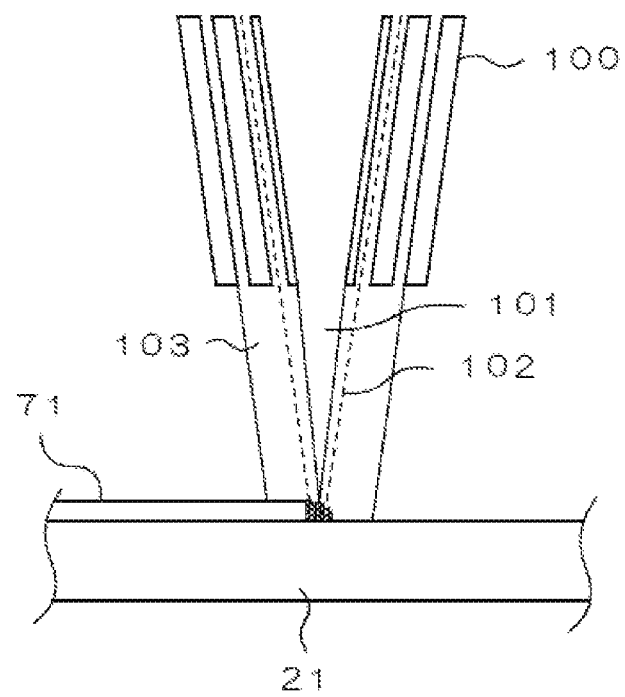
FIG. 4 is a schematic diagram for explaining laser cladding.

FIG. 4 is a schematic diagram for explaining laser cladding. Here, a case where the first build-up layer 71 is formed by performing laser cladding in the circumferential direction on the outer circumferential surface of the base material 21 of the inner ring 2 will be described. However, also when the second build-up layer 72 is formed on the inner circumferential surface of the base material 31 of the outer ring 3, laser cladding can be performed in a similar manner.

In the laser cladding, a laser beam 101 is used as a heat source. The laser beam 101 emitted from a nozzle 100 is applied so as to condense toward the base material 21. Not only the laser beam 101 but also a weld material 102 and a shielding gas 103 are injected from the nozzle 100, and the weld material 102 is melted by the laser beam 101 in the shielding gas 103.

As the shielding gas, for example, argon gas or helium gas is used. The weld material 102 is made of, for example, a powder material containing a Ni-based intermetallic compound alloy. The Ni-based intermetallic compound alloy is an alloy composed of an intermetallic compound between Ni (nickel) and another metal. Examples of another metal can include silicon (Si), titanium (Ti), aluminum (Al), and vanadium (V).

Specifically, a Ni-based intermetallic compound alloy containing Ni. Si. and Ti, a Ni-based intermetallic compound alloy containing Ni, Al, and V, or the like is used. In the Ni-based intermetallic compound alloy containing Ni, Si, and Ti, it is preferable that an amount of Ni should be 78.5 at % or more and 81.0 at % or less, that an amount of Si should be 7.5 at % or more and 12.5 at % or less, and that an amount of Ti should be 1.5 at % or more and 7.5 at % or less, and it is more preferable that an amount of Ni should be 78.5 at % or more and 80.5 at % or less, that an amount of Si should be 10.0 at % or more and 12.0 at % or less, and that an amount of TI should be 4.5 at % or more and 6.5 at % or less. In the Ni-based intermetallic compound alloy containing Ni, Al, and V, it is preferable that an amount of Ni should be 65.0 at % or more and 80.0 at % or less, that an amount of Al should be 4.0 at % or more and 15.0 at % or less, and that an amount of V should be 4.0 at % or more and 15.0 at % or less, and it is more preferable that an amount of Ni should be 67.0 at % or more and 77.0 at % or less, that an amount of Al should be 5.0 at % or more and 10.0 at % or less, and that an amount of V should be 7.0 at % or more and 14.0 at % or less. However, the composition of the Ni-based intermetallic compound alloy is not limited to the above.

During laser cladding, heat input by the laser beam 101 is controlled, and the weld material 102 is melted with low heat input. As a result, only the weld material 102 is melted on the surface of the base material 21, and the surface of the base material 21 is hardly melted. A position where the laser beam 101 is applied and a position where the weld material 102 is injected are gradually moved in the circumferential direction with respect to the outer circumferential surface of the base material 21, and the weld material 102 that has been melted is naturally cooled accordingly, and thus fixed on the base material 21 as a cladding layer.

The cladding layer continuously formed in this manner constitutes the first build-up layer 71 formed of the material containing the Ni-based intermetallic compound alloy. By using laser cladding, it is possible to form the first build-up layer 71 composed of a thin film having a thickness of 1 mm or less.

3. Method for Manufacturing Ball Bearing

When the ball bearing 1 is manufactured, first, the base material 21 of the inner ring 2 and the base material 31 of the outer ring 3 are formed by cutting a metal into a predetermined shape. Thereafter, a first build-up layer formation step of forming the first build-up layer 71 on the outer circumferential surface of the base material 21 of the inner ring 2 and a second build-up layer formation step of forming the second build-up layer 72 on the inner circumferential surface of the base material 31 of the outer ring 3 are performed. Either the first build-up layer formation step or the second build-up layer formation step may be performed first, or the steps may be performed simultaneously.

In the first build-up layer formation step, the weld material 102 (first weld material) containing the Ni-based intermetallic compound alloy is melted, and the melted weld material 102 is naturally cooled, whereby the first build-up layer 71 is formed on the outer circumferential surface of the base material 21 of the inner ring 2, as described above. In the present embodiment, in the first build-up layer formation step, hard particles (first hard particles) are dispersed in the melted weld material 102.

As the hard particles, for example, particles made of carbide such as tungsten carbide or niobium carbide are used. A ratio of the hard particles in the weld material 102 is, for example, preferably 10 to 60 vol %, more preferably 20 to 50 vol %, and still more preferably 30 to 40 vol %. However, the hard particles may be particles made of carbide other than tungsten carbide, or may be particles made of a material other than carbide, such as boride or nitride. In addition, not only the hard particles for improving strength, but also various other materials such as graphite can be dispersed in the weld material 102 as a material for improving lubricity.

In the second build-up layer formation step, the weld material 102 (second weld material) containing the NI-based intermetallic compound alloy is melted by laser cladding similar to that in the first build-up layer formation step, and the melted weld material 102 is naturally cooled, whereby the second build-up layer 72 is formed on the outer circumferential surface of the base material 31 of the outer ring 3.

In the second build-up layer formation step, as in the first build-up layer formation step, hard particles (second hard particles) are dispersed in the melted weld material 102. In the second build-up layer formation step, a material other than the hard particles may be dispersed in the weld material 102.

In this manner, after the first build-up layer 71 is formed on the outer circumferential surface of the base material 21 of the inner ring 2 and the second build-up layer 72 is formed on the inner circumferential surface of the base material 31 of the outer ring 3, a heat treatment is performed as necessary, and then a grinding process is performed. When the first build-up layer 71 and the second build-up layer 72 acquire a predetermined metal structure in a build-up state and exhibit a necessary characteristic (hardness), no heat treatment is necessary. However, when the first build-up layer 71 and the second build-up layer 72 do not acquire the necessary characteristic, a heat treatment needs to be performed on the layers. For example, in a case of a Ni—Al—V Ni-based intermetallic compound alloy (Ni-based double dual phase intermetallic compound alloy), an excellent high-temperature strength characteristic, which is unique to this alloy, is exhibited due to the formation of a double dual phase structure, but when a cooling rate is high (fast) during laser cladding, the double dual phase structure may not be formed. In this case, when the build-up layers are heated to a high temperature equal to or lower than their melting point and cooled at an appropriate speed, a double dual phase structure is formed, and the strength of the build-up layers can be expected to be improved.

The grinding process of the inner ring 2 is performed on, for example, the outer circumferential surface and a side surface of the inner ring 2, and then performed on the inner circumferential surface and the raceway surface (first raceway surface 61) of the inner ring 2. The grinding process of the outer ring 3 is performed on, for example, the side surface of the outer ring 3, and then performed on the outer circumferential surface and the raceway surface (second raceway surface 62) of the outer ring 3. However, when the ball bearing 1 is small, the base material 31 may be formed, in advance, to be large in order to secure rigidity, a cutting process may be performed after the second build-up layer formation step, and then a grinding process may be performed. After the grinding process is performed on the inner ring 2 and the outer ring 3 in this manner, a superfinishing process (mirror finishing process) is performed on the first raceway surface 61 and the second raceway surface 62. The inner ring 2, the outer ring 3, and the plurality of balls 4 are assembled by combining the inner ring 2 and the outer ring 3 with the balls 4 so that the inner ring 2 and the outer ring 3 have a predetermined clearance (internal clearance). At this time, the plurality of balls 4 are rollably retained between the first build-up layer 71 and the second build-up layer 72, so that the ball bearing 1 in which the inner ring 2 and the outer ring 3 can be relatively rotated is manufactured. When the inner ring 2, the outer ring 3, and the plurality of balls 4 are assembled, a solid lubricant may be applied to each of these members. As the solid lubricant, a tungsten disulfide or graphite lubricant or the like can be used.

4. Action and Effect (1) In the present embodiment, both the first build-up layer 71 and the second build-up layer 72 each in contact with the plurality of balls 4 are formed by laser cladding. By using laser cladding, it is possible to form the first build-up layer 71 and the second build-up layer 72 having high wear resistance at a high temperature against contact with the plurality of balls 4 while minimizing thermal influence on each of the base materials 21 and 31 of the inner ring 2 and the outer ring 3. Thus, the ball bearing 1 having excellent heat resistance can be manufactured at low cost.

(2) In the present embodiment, the first build-up layer 71 and the second build-up layer 72 are formed using the weld material 102 containing the Ni-based intermetallic compound alloy. As a result, the ball bearing 1 having higher wear resistance at a high temperature can be manufactured.

(3) Furthermore, in the present embodiment, the first build-up layer 71 and the second build-up layer 72 are formed using the weld material 102 in which hard particles are dispersed. As a result, the wear resistance at a high temperature of the ball bearing 1 can be further improved.

Vickers hardnesses of the first build-up layer 71 and the second build-up layer 72 are, for example, preferably 300 to 500 HV, more preferably 350 to 450 HV, and still more preferably about 400 HV at 600° C. As described above, the ball bearing 1 in the present embodiment has sufficient strength in a high-temperature environment of 400° C. or higher (particularly 600° C.), and can be used for a long time in a high-temperature environment.

(4) In the present embodiment, wear debris generated by rolling of the plurality of balls 4 in contact with the first build-up layer 71 and the second build-up layer 72 is discharged from the contact surfaces (raceway surfaces 61 and 62) into the grooves 8. As a result, wear of the contact surface caused by the wear debris can be prevented, so that durability of the ball bearing 1 can be further improved. In addition, since places where the plurality of balls 4 are brought into contact with the first build-up layer 71 and the second build-up layer 72 can be divided to increase the number of contact points, the load can be dispersed, so that the loading capability of the ball bearing can be improved.

DESCRIPTION OF REFERENCE SIGNS 1 ball bearing
2 inner ring
3 outer ring
4 ball
5 space
8 groove
21 base material
31 base material
61 first raceway surface
62 second raceway surface
71 first build-up layer
72 second build-up layer
100 nozzle
101 laser beam
102 weld material
103 shielding gas

The invention claimed is:

1. A ball bearing, comprising:
a plurality of balls;
an inner ring comprising a base material having a first annular recess and a cladding material confined to the first annular recess, the cladding material forming a first concave raceway defining an annular first raceway surface that extends in a circumferential direction along an outer circumferential surface of the inner ring;
wherein said plurality of balls is brought into contacts with said first raceway surface and rolls in said circumferential direction;
an outer ring comprising the base material having a second annular recess and the cladding material confined to the second annular recess, the cladding material forming a second concave raceway defining an annular second raceway surface that extends in a circumferential direction along an inner circumferential surface of the outer ring;

wherein the said plurality of balls is brought into contact with said second raceway surface and rolls in said circumferential direction; and wherein said first raceway surface and said second raceway surface comprise are characterized by a high-temperature wear resistance that is substantially greater than a high-temperature wear resistance of the base material.

2. The ball bearing, according to claim 1, wherein:
the outer circumferential surface of the inner ring defines a width transverse to the circumferential direction;
the first concave raceway defines a width transverse to the circumferential direction;
the width of the inner ring is substantially greater than the width of the first annular recess;
the inner circumferential surface of the outer ring defines a width transverse to the circumferential direction;
the second annular recess defines a width transverse to the circumferential direction;
the width of the outer ring is substantially greater than the width of the second concave raceway.

3. The ball bearing, according to claim 1, wherein the cladding maternal comprises an Ni-based intermetallic compound alloy.

4. The ball bearing, according to claim 1, wherein the cladding material comprises a double dual phase intermetallic compound alloy.

5. The ball bearing according to claim 1, wherein:
the base material is stainless steel; and
the cladding material comprises a Ni—Al—V intermetallic compound alloy.

6. The ball bearing, according to claim 1, wherein cladding material comprises disbursed hard particles.

7. The ball bearing, according to claim 1, further comprising
a first annular grove formed in the cladding material confined to the first annular recess;
a second annular grove formed in the cladding material confined to the first annular recess.

8. The ball bearing, according to claim 1, wherein the cladding material is characterized by a Vickers hardness in the range of 300 to 500 HV.

9. The ball bearing, according to claim 1, wherein:
the first concave raceway has a uniform thickness in the circumferential direction;
the second concave raceway has a uniform thickness in the circumferential direction.

10. The ball bearing of claim 1, fabricated by a process comprising:
forming the first recess in the inner ring;
building up the cladding material within the first recess;
grinding the cladding material within the first recess;
polishing the cladding material within the first recess;
forming the second recess in the outer ring;
building up the cladding material within the second recess;
grinding the cladding material within the second recess;
polishing the cladding material within the second recess.

11. The ball bearing of claim 10, wherein the process further comprises:
forming a first groove in the cladding material within the first recess;
forming a second groove in the cladding material within the first second.

12. The ball bearing of claim 10, wherein the process further comprises applying a heat treatment to the cladding material.

13. The ball bearing of claim 12, wherein the heat treatment comprises heating the cladding material to a high temperature equal to or lower than its melding point and the cooling the classing material at a rate allowing formation of a double dual phase structure.

14. The ball bearing of claim 10, wherein the process further comprises disbursing hard particles into the cladding material during a laser welding build-up process.

15. The ball bearing of claim 10, wherein the process further comprises:
disbursing first hard particles into the cladding material during a first build-up process:
naturally cooling the cladding material;
disbursing second hard particles into the cladding material during a second welding build-up process.

16. The ball bearing of claim 10, wherein the cladding material is fixed within the first and second recesses by thermal spraying, plating, shrink fitting, or laser welding.

* * * * *